H. C. Fritz.
Shaft Coupling.

Nº 64,516. Patented May. 7. 1867.

Witnesses.
J. C. Shaw.
Geo. Buckley.

Inventor
Henry C. Fritz

United States Patent Office.

HENRY C. FRITZ, OF PHILADELPHIA, PENNSYLVANIA.

Letters Patent No. 64,516, dated May 7, 1867.

IMPROVEMENT IN SHAFT-COUPLING.

*The Schedule referred to in these Letters Patent and making part of the same*

TO ALL WHOM IT MAY CONCERN:

Be it known that I, HENRY C. FRITZ, of the city of Philadelphia, State of Pennsylvania, have invented a new and useful Shaft-Coupling; and I do hereby declare that the following is a full, clear, and exact description of the construction and operation of the same, reference being had to the annexed drawings, making part hereof, in which—

Figure 1:
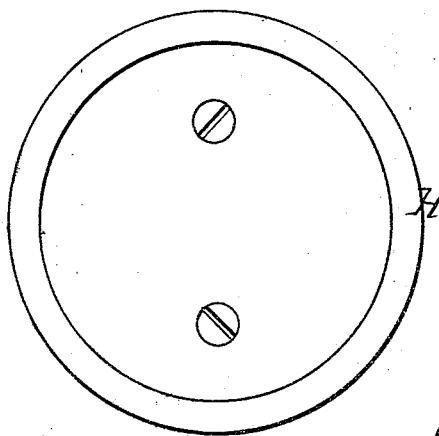

Figure 1 is an end view of the coupling case.

Figure 2:
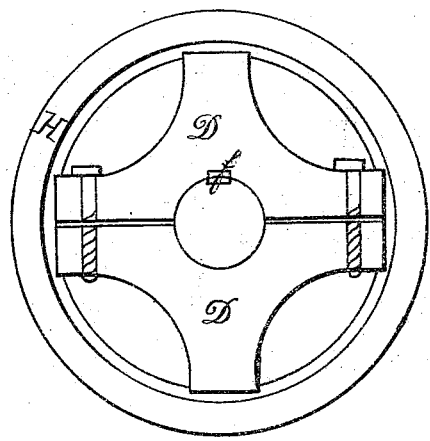

Figure 2, an end view of the coupling, with the end of the case removed.

Figure 3:
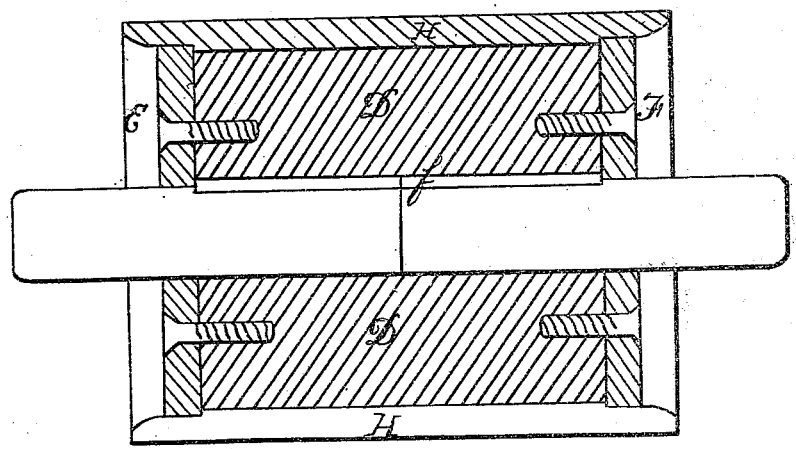

Figure 3, a longitudinal section of the coupling and case, and of part of two sections of shafting.

Figure 4:
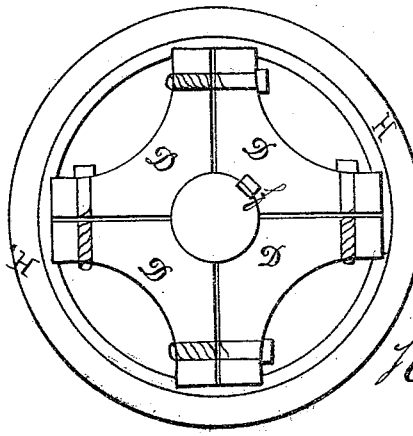

Figure 4, an end view of my coupling, when made in four parts.

The shafting of mills, &c., is made in separate short sections, which are joined by couplings, and so made to act as one continuous shaft. The couplings commonly used are made in two parts, each of which is shaped like an ordinary pulley, faced off on one side, one of the parts being driven and keyed tightly on to each end of the several sections of shafting, faced side out, and when the sections of shafting bearing them are placed in line, the two contiguous parts of couplings are bolted together. It frequently becomes necessary to remove some of the sections of shafting in order that the pulleys thereon may be removed, and for other purposes, and in such cases it has been necessary by main force to sledge off the faced pulley-like parts composing the coupling, before any pulley on the shaft could be removed.

The object of my invention is to make a coupling of such mechanical construction that it can be removed speedily and without sledging, and without the necessity of moving any other of the sections when any particular section of the shafting has to be taken down, or whenever it is desired to put new pulleys on or take pulleys off of the shafting.

In figs. 2 and 3, D is the coupling, which is made of cast iron in two parts, divided longitudinally, and fastened about the shaft by screws or bolts at any point where sections of the shaft meet, so as to clamp the shaft as shown. The coupling may be made in four parts, divided as aforesaid, and bolted together so as to clamp the shaft as shown in fig. 4. A key, $f$, located at any desired point in either of these parts of the coupling, is employed as an additional means to keep the shaft from turning in the coupling. A case, H, of cast iron encloses the coupling, and gives it additional strength. This case is grooved inside so that the extremities of the arms of the coupling slide in the grooves as shown in section in figs. 2 and 4. After the case H has been drawn over the coupling, the two collars E F are pressed into the positions shown in fig. 3, and fastened to the coupling by screws or bolts. Thus the coupling is entirely enclosed. The case H may be used as a pulley, and when the case is intended to be used as a pulley it may be made of greater or less diameter, as may be required, the arms of the coupling being in such cases correspondingly lengthened or shortened.

Having thus described my invention, what I claim, and desire to secure by Letters Patent, is—

A coupling divided into parts longitudinally when bolted together by bolts or screws through the flanges, in combination with the sleeve or cover H, substantially as shown and described.

HENRY C. FRITZ.

Witnesses:
    J. E. SHAW,
    GEO. BUCKLEY.